(12) United States Patent  
Montbel et al.

(10) Patent No.: US 9,205,613 B2  
(45) Date of Patent: Dec. 8, 2015

(54) TIRE VULCANIZING MOULD INCLUDING AN ARRAY OF GROOVES AND NOTCHES

(75) Inventors: Michel Montbel, Orleat (FR); Olivier Lauwers, Yronde et Buron (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 761 days.

(21) Appl. No.: 13/139,804

(22) PCT Filed: Dec. 21, 2009

(86) PCT No.: PCT/FR2009/052637  
§ 371 (c)(1),  
(2), (4) Date: Jul. 6, 2011

(87) PCT Pub. No.: WO2010/076521  
PCT Pub. Date: Jul. 8, 2010

(65) Prior Publication Data  
US 2011/0259487 A1    Oct. 27, 2011

(30) Foreign Application Priority Data  
Dec. 31, 2008  (FR) ...................................... 08 59165

(51) Int. Cl.  
*B29C 33/00* (2006.01)  
*B29D 30/06* (2006.01)

(52) U.S. Cl.  
CPC .... *B29D 30/0606* (2013.01); *B29D 2030/0613* (2013.01); *Y10T 152/10* (2015.01)

(58) Field of Classification Search  
CPC ....................................................... B29C 33/60  
USPC ............................................................ 425/46  
See application file for complete search history.

(56) References Cited

U.S. PATENT DOCUMENTS

| 2,121,955 | A | 6/1938 | Eger |
| 3,570,571 | A | 3/1971 | Riches |
| 6,264,453 | B1 | 7/2001 | Jacobs et al. |
| 2007/0095447 | A1 | 5/2007 | Nguyen et al. |

FOREIGN PATENT DOCUMENTS

| EP | 1 782 970 A1 | 5/2007 |
| EP | 1 588 830 B1 | 5/2009 |
| EP | 1 872 975 B1 | 8/2009 |
| JP | 8-25361 A | 1/1996 |

(Continued)

OTHER PUBLICATIONS

Search Report and Written Opinion dated Jul. 31, 2009 for French Application No. 0859165.

(Continued)

*Primary Examiner* — Christina Johnson  
*Assistant Examiner* — Xue Liu  
(74) *Attorney, Agent, or Firm* — Dickinson Wright PLLC

(57) ABSTRACT

The lining for a mold for vulcanizing a tire, comprises at least one network of cords and of sipe blades for molding a corresponding network of grooves and of cuts in the tread. The network of cords and of blades comprises at least one node between two cords. Each cord of the network overmolds at least the edge of a blade.

18 Claims, 3 Drawing Sheets

(56) References Cited

FOREIGN PATENT DOCUMENTS

| JP | 2003-80360 A | 3/2003 |
| JP | 2005-193770 A | 7/2005 |

OTHER PUBLICATIONS

International Search Report (PCT/ISA/210) issued on May 6, 2010, by French Patent Office as the International Searching Authority for International Application No. PCT/FR2009/052637.

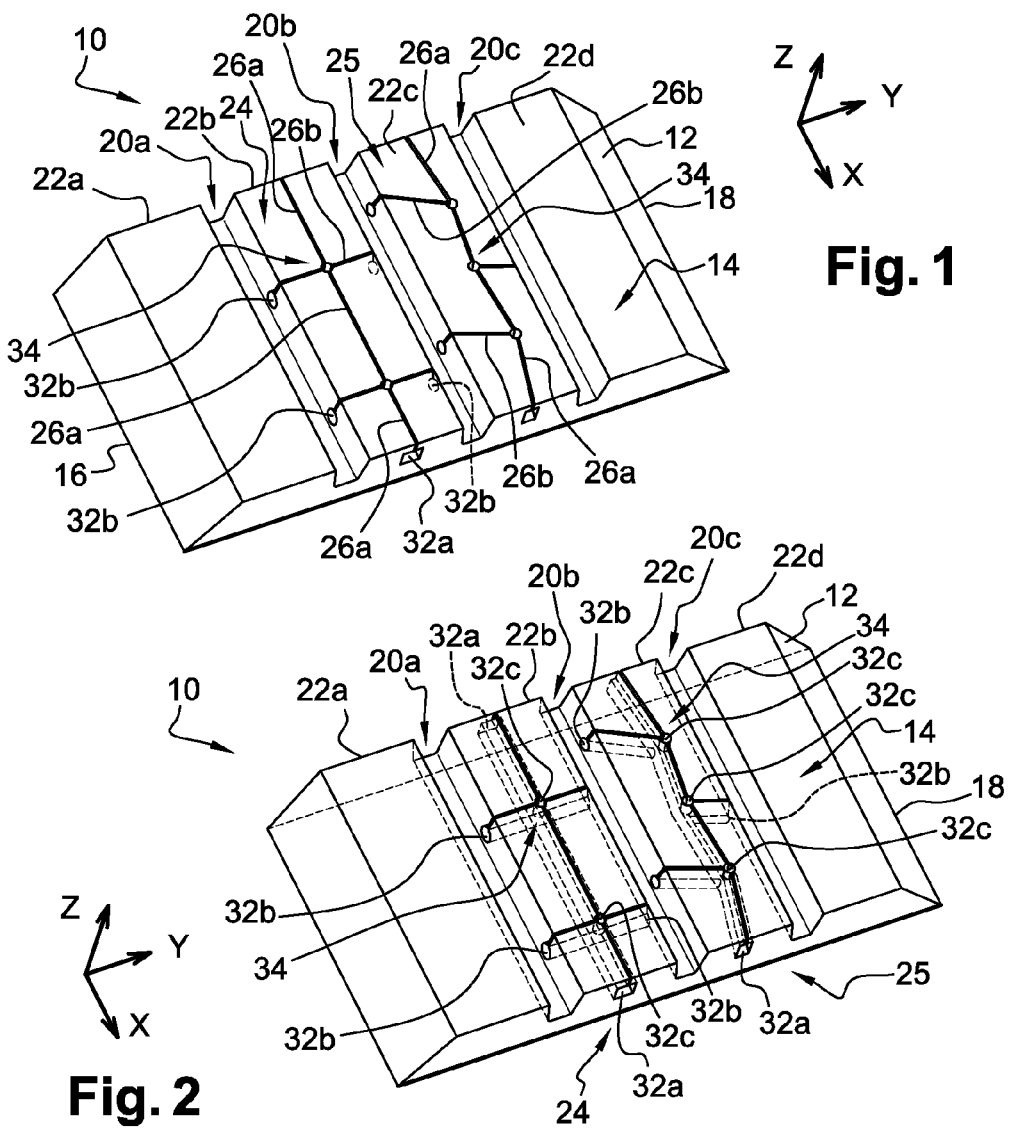
Fig. 1
Fig. 2
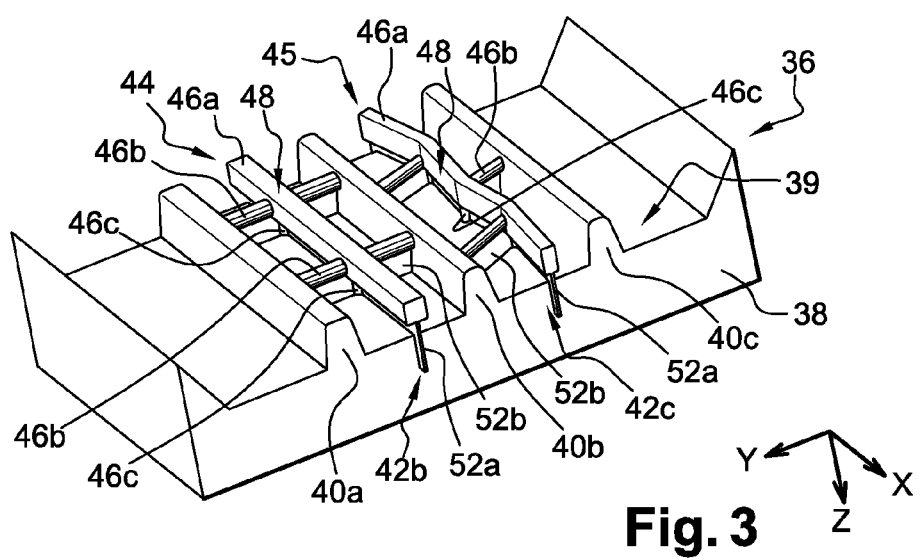
Fig. 3

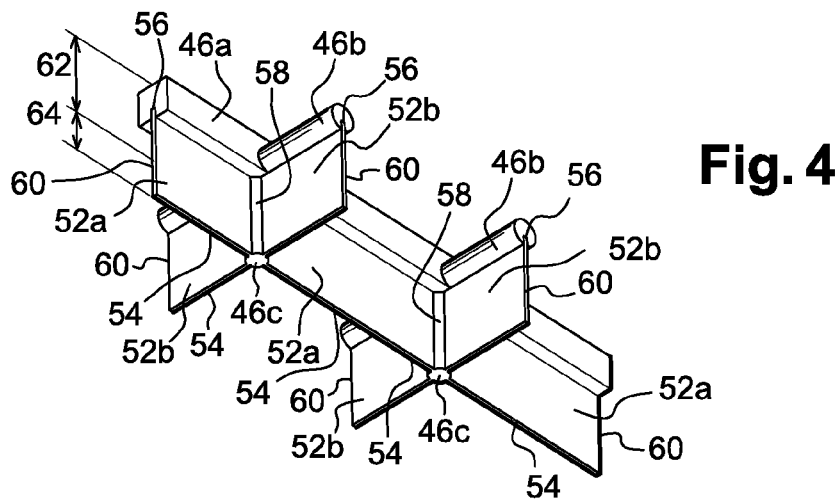
Fig. 4
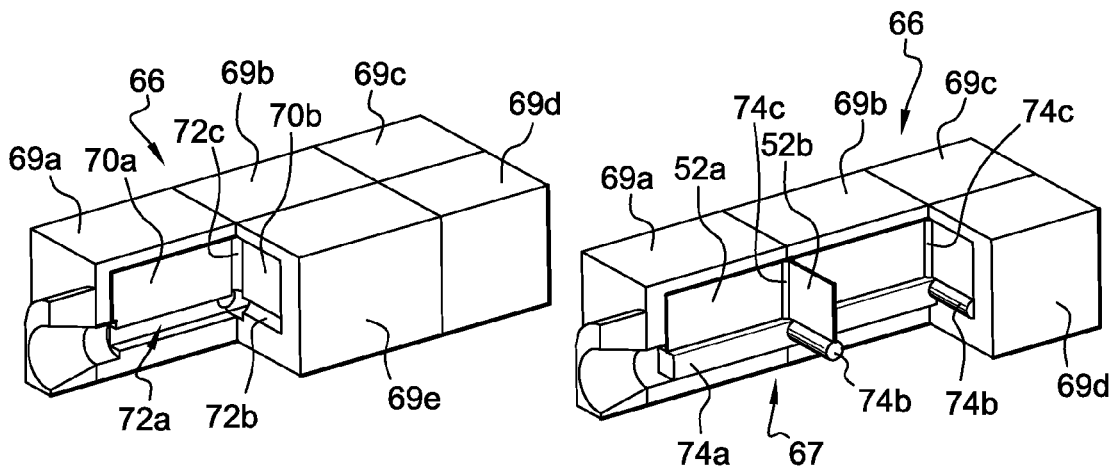
Fig. 5
Fig. 6
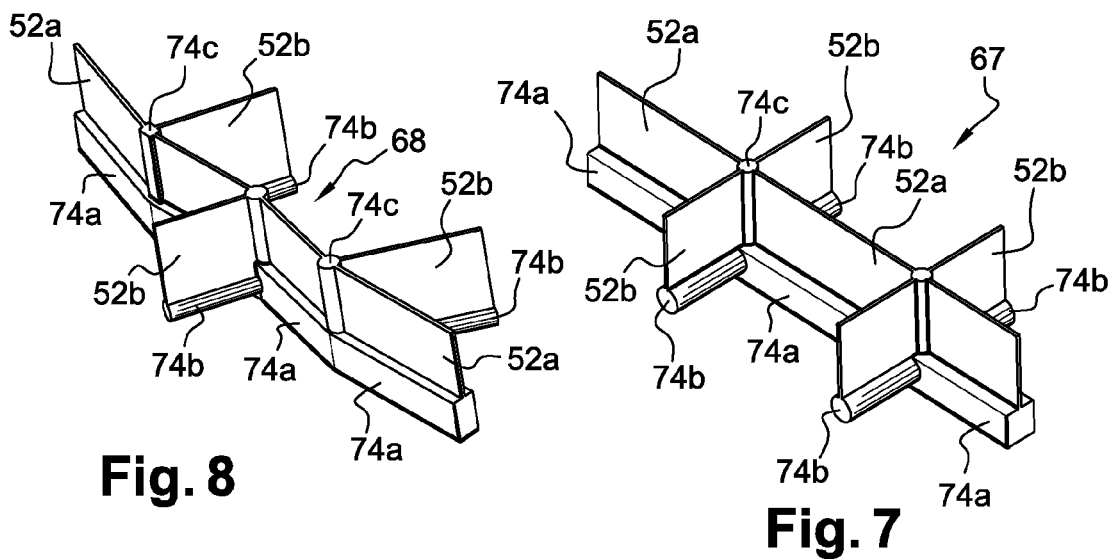
Fig. 8
Fig. 7

TIRE VULCANIZING MOULD INCLUDING AN ARRAY OF GROOVES AND NOTCHES

The present invention relates to the technical field of tires.

In what follows, the axis of a tire denotes its axis of revolution. This axis also defines an axial direction of the mould when considering the tire in the mould. The direction perpendicular to the axis of revolution is given the name "radial direction", and the circumferential direction describes the circumference of the tire in a plane perpendicular to the axial direction.

To make what follows easier to understand, the term "final lining" is the name given to the part that has the definitive shape of the mould intended to impart its shape to the tire. The final lining is therefore the negative of the final tire.

A tire generally comprises a tread which is of revolution about the axis of the tire. The tire is vulcanized in a mould comprising one or more final molding linings distributed circumferentially about the axis.

Document EP 1 872 975 discloses a final mould lining comprising a pair of blades of a single piece, allowing a pair of cuts to be molded in the tread. Each blade separates two blocks of rubber and bears projections for molding reliefs in each of the rubber blocks. One of these blades also carries a hollow cord or strip for molding a groove in the tread.

The reliefs and groove make it possible in particular to limit the loss of grip experienced by the tire as the tread becomes worn. Specifically, the wearing-away of the rubber from the tread causes the reliefs and the groove to come flush with the surface of the tread. The flush reliefs and groove form tread patterns able at least in part to replace the initial tread patterns on the tread which have been worn away.

Furthermore, the reliefs and the groove have complicated shapes allowing the tread of the tire to enjoy high levels of performance, particularly under braking or when driving on a wet surface.

However, the lining described in document EP 1 872 975 is relatively complicated to manufacture because of the one-piece structure of the blades.

It is an object of the invention to provide a mould lining that is easier to manufacture and yields a tread that exhibits high levels of performance.

To this end, one subject of the invention is a lining for a mould for vulcanizing a tire comprising at least one array or network of cords or strips and of sipe blades for molding a corresponding network of grooves and of cuts in the tread, the network of cords and of blades comprising at least one node between two cords, each cord of the network overmoulding at least the edge of a blade.

The lining makes it possible to obtain good levels of performance. Specifically, each cord allows the molding of each groove which, together which each cut molded from the blade, gives the tire good levels of performance. Furthermore, the lining is relatively simple to manufacture. Specifically, a simple step of overmoulding the edge of the blade is enough to manufacture the assembly formed of the cord and the blade. The cord and the blade can be made in materials which are different but compatible and exhibit good affinity. The cord is preferably solid, making it possible to avoid the ingress of rubber into the cord which was something that could happen in the lining of the prior art.

What is meant here by array or network is a collection of at least two cords joined together at a node. The tire molded on the lining thus has a network of intercommunicating grooves. Such a network notably alloys effective dispersal of heat from the tread and allows the tread pattern to regenerate when half worn.

According to optional features of the lining:
the network of cords comprises at least one circumferential cord for molding a circumferential groove in the tread.
the network of cords comprises at least one transverse cord for molding a transverse groove in the tread.
the network of cords comprises at least one radial cord for molding a radial groove in the tread.

Another subject of the invention is a mould for vulcanizing a green tire preform, comprising at least one molding lining as defined hereinabove.

A further subject of the invention is a method of manufacturing a so-called final lining for molding part of a tread of a tire, in which the final lining is manufactured by overmoulding edges of a network of blades for molding a corresponding network of cuts in the tread with a network of cords for molding a corresponding network of grooves in the tread.

The part intended to mould a lining of the mould will be termed a "die". The die is therefore the positive of the tire and the negative of the lining. Likewise, as will be seen hereinafter, a distinction will be made between final linings and dies and intermediate linings and dies.

As an option, each blade is made of steel and each cord is made of aluminium.

According to one feature of the method, the final lining is molded on a die known as the final die, the final die comprising:
a network of grooves for molding the network of cords of the final lining, and
the network of blades the edges of which open into the network of grooves for molding the network of cords of the final lining so that the said edges of the network of blades can be overmoulded with the network of cords of the final lining. Advantageously, each cord of the final lining is made of a material that has good thermal properties, such as aluminium.

As an option, the final die is made of a material which is inert towards the material in which the network of cords of the final lining is molded, for example in a material containing sand and/or plaster.

The use of a material containing sand or plaster in which to produce the final die allows the final lining to be released from the mould easily. Specifically, such a material can easily be broken up and, what is more, it is inexpensive and can be recycled.

According to another optional feature of the method, prior to molding the final lining on the final die, the final die is manufactured as follows:
an intermediate lining is manufactured, and
the final die is molded on the intermediate lining.
As an option, the intermediate lining comprises:
at least one removable intermediate network molded in a mould counterpart, the said network comprising a network of intermediate cords for molding the network of grooves of the final die overmoulded over the edges of the network of blades, and
a base comprising at least one housing for positioning the intermediate removable network.

The base of the intermediate lining is manufactured using an intermediate die. This base is generally made in a shape memory material such as a silicone-based material. For preference, the intermediate die is produced directly by rapid prototyping or in a readily machinable material such as plastic.

Advantageously, the network of intermediate cords of the intermediate removable network is mounted in a material that can be melted, for example wax. The intermediate removable network is preferably inserted in the intermediate lining.

What is meant by a material that can be melted is notably a material which has a solid-liquid phase transition. The use of wax allows each intermediate cord to be molded in a material that can easily be molded and reused.

According to another optional feature of the method, the mould counterpart comprises:

a network of intermediate grooves for molding the network of intermediate cords of the intermediate removable network, and housings for positioning of the network of blades of the final lining, each housing opening into an intermediate groove.

The mould counterpart is generally formed of several parts collaborating with one another and produced from a material of the plastic type or of a shape memory material such as silicone, via a pattern mould stage.

Advantageously, the network of intermediate cords is melted:

after the final die has been molded on the intermediate lining, and before the final lining is molded on the final die.

By melting each intermediate cord after the final die has been molded on the intermediate lining, the channels for molding the cords of the final lining are created in the final die.

Another subject of the invention is a mould counterpart for molding a network of cords and of blades of a mould lining for molding part of a tread of a tire, comprising:

a network of grooves for molding a network of cords, and housings for positioning the network of blades with respect to the network of grooves and opening into at least one of the grooves.

A final subject of the invention is a method of vulcanizing a green tire preform, in which the green preform is vulcanized in a mould as defined hereinabove.

The invention will be better understood from reading the following description, given solely by way of non limiting example and with reference to the drawings in which:

FIG. 1 is a perspective view of part of a tread of a tire according to the invention;

FIG. 2 is a view showing hidden detail of the part of the tread of the tire of FIG. 1;

FIG. 3 is a perspective view of a final lining according to the invention, comprising first and second networks of cords and of blades for manufacturing the tire of FIG. 1;

FIG. 4 is an isolated perspective view of part of the first network of FIG. 3;

FIGS. 5 and 6 are perspective views of a mould counterpart according to the invention;

FIGS. 7 and 8 are perspective views of examples of intermediate removable network molded from mould counterparts like those illustrated in FIGS. 5 and 6;

Figure 9:
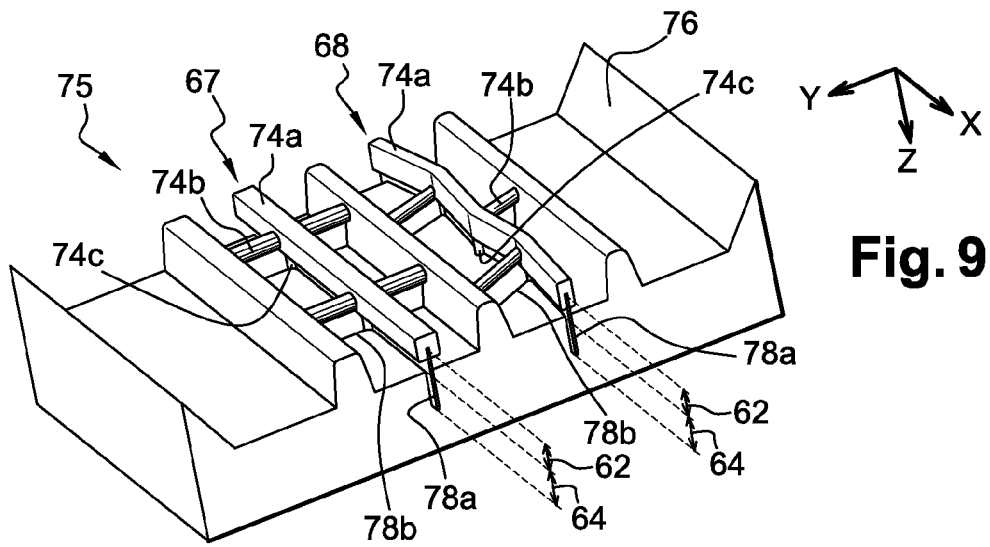
FIG. 9 is a perspective view of an intermediate lining comprising intermediate removable networks of the type of those illustrated in FIGS. 7 and 8.

The mutually orthogonal axes X, Y, Z corresponding to the customary radial (OZ), axial (OY) and circumferential (OX) orientations of a tire have been marked on the figures.

FIGS. 1 and 2 depict a tire according to the invention denoted by the overall reference 10. The tire has an overall shape exhibiting symmetry of revolution about the axis Y.

The tire 10 comprises a tread 12. The tread 12 comprises an external running surface 14 intended to be in contact with the road surface. The tread 12 is delimited by two shoulders 16, 18. In addition, the tread 12 comprises circumferential channels 20*a-c* formed in the rubber of the tread 12. The channels 20*a-c* are spaced axially apart and distributed across the axial dimension of the tread 12.

The shoulders 16, 18 and the channels 20*a-c* delimit circumferential bands 22*a-d* of rubber. In this particular instance, the band 22*a* is delimited by the shoulder 16 and the channel 20*a*, the band 22*b* by the channels 20*a* and 20*b*, the band 22*c* by the channels 20*b* and 20*c*, and the band 22*d* by the channel 20*c* and the shoulder 18.

Each band 22*b*, 22*c* respectively comprises a network 24, 25 of cuts 26*a*, 26*b* the depth of which in this instance is substantially equal to the radial height of each band of rubber 22*b*, 22*c*. Each network of cuts 24, 25 also comprises grooves 32*a*, 32*b*, 32*c* molded in the bands 22*b*, 22*c*. Each groove 32*a-c* has a square, rectangular or round cross section. As an alternative, the cross section could be any.

Each groove 32*a*, known as a circumferential groove, of the network 24 extends circumferentially about the axis Y and substantially parallel to the channels 20*a-c*. Each circumferential groove 32*a* of the network 25 extends circumferentially about the axis Y in a skew line. Each groove 32*a* of each network 24, 25 is situated axially between the channels 20*a*, 20*b* and 20*b*, 20*c*, respectively.

Each groove 32*b* known as a transverse groove of the network 24 has a substantially straight shape and extends axially substantially parallel to the axis Y. Each transverse groove 32*b* of the network 25 has a substantially straight shape and extends in a direction that makes a non-zero angle with the axial direction Y. Each groove 32*b* of each network 24, 25 extends from the circumferential groove 32*a* as far as the channels 20*a*, 20*b* or 20*c* into which it opens.

Each so-called radial groove 32*c* of each network 24, 25 forms a well extending radially from the circumferential groove 32*a* as far as the running surface 14 onto which it opens. Each groove 32*c* is substantially straight and runs substantially parallel to the radial direction Z of the tire 10.

Each network 24, 25 thus comprises several nodes 34. Each node 34 corresponds to the intersection of at least two grooves molded into the tread 12. In this particular instance, each node 34 corresponds to the intersection of the circumferential groove 32*a*, of at least one transverse groove 32*b* and of a well 32*c*.

Each cut 26*a* opens into two successive wells 32*c* and the circumferential groove 32*a*. Each cut 26*a* of the network 24 has a circumferential overall orientation, that is to say runs substantially perpendicular to the axis Y. Each cut 26*a* of the network 25 has a substantially circumferential overall orientation in a skew line.

FIG. 3 depicts a lining 36, known as a final lining, according to the invention of a mould used to manufacture the tire 10 of FIGS. 1 and 2. Because the final lining 36 is the negative of the tire 10 depicted in FIGS. 1 and 2, the final lining 36 has features that can readily be deduced from those of the tire 10.

The axial, radial and circumferential directions of the mould correspond respectively to the axial, radial and circumferential directions of the tire 10 placed in the mould.

The lining 36 comprises a base 38 bearing a surface 39 for molding the tread surface 14 of the tire 10.

The lining 36 comprises several radially spaced circular cords 40*a-c* intended respectively for molding the channels 20*a-c*. Each circular cord 40*a-c* extends radially from the surface 39 over a height that corresponds to the depth of each channel 20*a-c*. Each cord 40*a-c* extends circumferentially in a direction substantially parallel to the circumferential direction X of the mould. The cords 40a, 40b delimit a band 42b for molding the band 22b. The cords 40b, 40c delimit a band 42c for molding the band 22c.

In addition, lining 36 comprises networks 44, 45 of cords 46a-c for respectively molding the networks 24, 25 of grooves 32a-c. Each cord 46a-c in this particular case has a substantially square, rectangular or round cross section. Each cord 46a-c is made of aluminium.

Each cord 46a, known as a circumferential cord, allows the molding of the circumferential groove 32a. The cord 46a of the network 44 extends circumferentially about the axis Y substantially parallel to the cords 40a-c. The cord 46a of the network 45 extends circumferentially about the axis Y in a skew line. In this particular instance, each cord 46a of each network 44, 45 is situated axially between the cords 40a, 40b and 40b, 40c, respectively.

Each cord 46b known as a transverse cord allows the molding of a transverse groove 32b. In this particular instance, each transverse cord 46b is straight. Each transverse cord 46b of the network 44 extends axially substantially parallel to the axis Y. Each transverse cord 46b of the network 45 has a substantially straight shape and extends in a direction that makes a non-zero angle with the axial direction Y. Each cord 46b connects the corresponding circumferential cord 46a to one of the cords 40a, 40b or 40c.

Each cord 46c known as a radial cord of each network 44, 45 forms a lug connecting the circumferential cord 46a and the molding surface 39. Each lug 46c allows the molding of a well 32c, is substantially straight and runs substantially parallel to the radial direction Z of the mould. Each network 44, 45 thus comprises several nodes 48. Each node 48 corresponds to the intersection of at least two cords of the lining 36. In this particular instance, each node 48 corresponds to the intersection of the circumferential cord 46a, of at least one transverse cord 46b and of a lug 46c.

Each network 44, 45 also comprises metal blades 52a, 52b for respectively molding the networks 24, 25 of cuts 26a, 26b. In this particular instance, the blades 52a, 52b are made of steel.

With reference to FIG. 4 which depicts part of the network 44 in isolation from the base 38, each blade 52a, 52b have two edges 54, 56 known as longitudinal edges, and two edges 58, 60 known as radial edges. Each longitudinal edge 54 is overmoulded with the base 38 so as to hold each blade 52a, 52b in the base 38.

Each blade 52a, 52b has a portion 62 extending radially over a dimension intended to define the depth of each cut 26a, 26b and a portion 64 extending radially over a dimension intended to define the part of the blade that is overmoulded in the base 38.

Each radial edge 58, 60 of each blade 52a is overmoulded with one of the lugs 46c. Each longitudinal edge 56 of each blade 52a is overmoulded with the circumferential cord 46a.

Each radial edge 58 of each blade 52b is overmoulded with one of the lugs 46c. Each longitudinal edge 56 of each blade 52b is overmoulded with a transverse cord 46b. Further, each edge 60 of each blade 52b is overmoulded with the corresponding cord 40a-c.

The lining 36 can be manufactured by implementing a method according to the invention, the key steps of which will be described hereinbelow with reference to FIGS. 5 to 11.

FIGS. 5 and 6 depict a mould counterpart 66. To simplify the description, the mould counterpart 66 depicted in FIGS. 5 and 6 makes it possible to obtain an intermediate removable network 67 (FIG. 7) of a shape substantially similar to the network 44 of the final lining 36 of FIG. 3. Using the same approach it will be possible to deduce the characteristics of the mould counterpart 66 that yields an intermediate removable network 68 (FIG. 8) corresponding to the network 45.

The mould counterpart 66 comprises six detachable blocks 69a-f. Each block 69a-f comprises a housing 70a for positioning a circumferential blade 52a and a housing 70b for positioning a transverse blade 52b. The mould counterpart 66 also comprises grooves 72a-c, known as intermediate grooves, for molding the intermediate cords 74a-c of the intermediate network 67. In this instance, each block 69a-f comprises one quarter of each groove 72a-c.

Each housing 70a opens into the intermediate grooves 72a, 72c and each housing 70b opens into the intermediate grooves 72b, 72c. Blocks 69a-f are made in a shape memory material. As an alternative, the blocks 69a-f are made of a material that can be easily machined or are made by rapid prototyping.

Next, the intermediate removable network 67 is molded in the molded counterpart 66. The intermediate removable network 67 comprises, firstly, the intermediate cords 74a-c molded from the intermediate grooves 72a-c and analogous with the cords 46a-c and, secondly, the blades 52a, 52b. Each intermediate cord 74a-c is overmoulded onto the edge 56, 58 of each corresponding blade 52a-b.

In this particular case, each blade 52a, 52b is positioned in each housing 70a-c. In a later step, the mould counterpart 66 is closed by bringing the blocks 69a-f closer together. Then each intermediate cord 74a-c is molded in a material that can be melted, in this case a hot melt material, for example wax. After cooling, the removable blocks 69a-f are separated so that the intermediate removable network 67 can be extracted from the mould counterpart 66. After a setting time, particularly aimed at eliminating molding residue, the intermediate network 67 illustrated in FIG. 7 is then obtained. The intermediate network 68 is depicted in FIG. 8.

FIG. 9 depicts an intermediate lining 75. The intermediate lining 75 comprises a base 76 and the removable intermediate networks 67 and 68. The intermediate lining 75 is manufactured by assembling the base 76 and the networks 67, 68.

The base 76 is produced from an intermediate die (not depicted) made of a readily machinable plastic. The base 76 is made from a shape memory material, in this instance silastene, by molding on the intermediate die. The base 76 has cutouts 78a, 78b forming housings for the positioning of the networks 67, 68 with respect to the base 76. In this particular instance, each cutout 78a is used for positioning the portion 64 of each blade 52a. Each cutout 78b is used for positioning the portion 64 of each blade 52b.

Next, a final die 80 is molded on the intermediate lining 75. In this particular instance, the final die 80 is made of a material which is inert towards the material from which the cords 46a-c of the final lining 36 are being molded. This material preferably contains sand and/or plaster.

Figure 10:
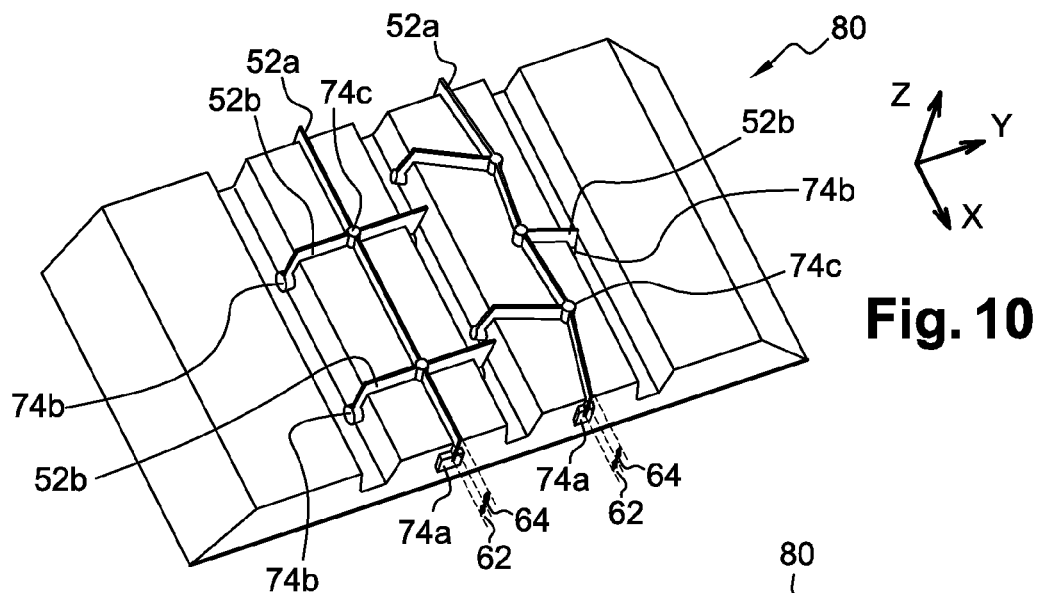
FIGS. 10 and 11 are perspective views of a final die molded on the intermediate lining of FIG. 9, before and after the intermediate cords have been melted, respectively.
Figure 11:
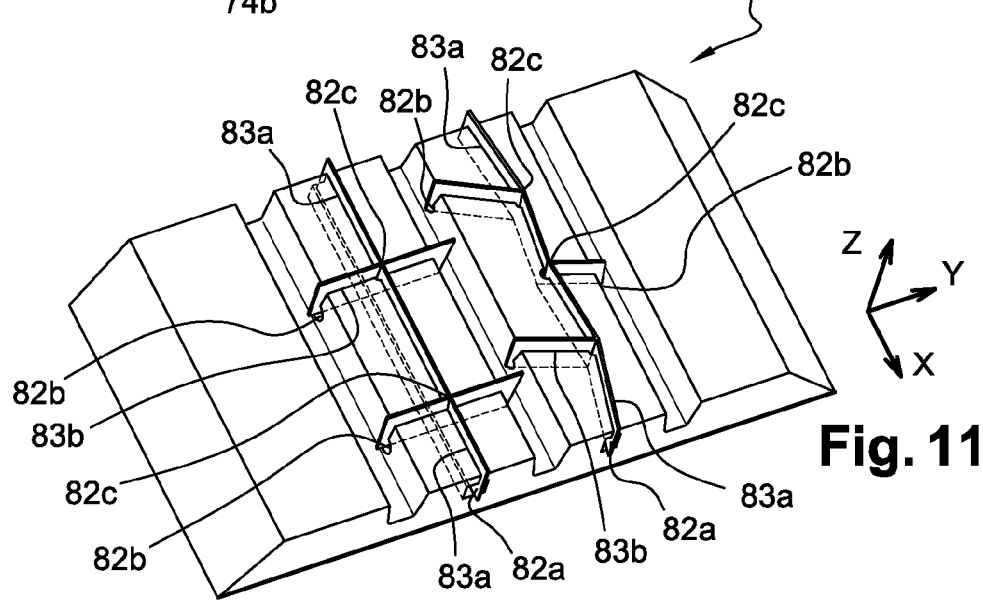

The base 76 and the final die 80 are then separated as illustrated in FIG. 10. The blades 52a, 52b are thus transferred to the final die 80. In this instance, each portion 62 of each blade 52a, 52b is overmoulded with the final die 80. Each portion 64 and each edge 60 on the other hand is free. The intermediate cords 74a-c made of wax are also held captive in the final die 80.

The final die 80 is then heated and thus each cord 74a-c in the final die 80 is melted. This then yields the final die 80 depicted in FIG. 11.

The final die 80 comprises grooves 82a-c for respectively molding the cords 46a-c of the final lining 36 and housings 83a-b for positioning each blade 52a-b. Each housing 83a-b opens into one of the grooves 82a-c. The final die 80 also comprises the blades 52a-b each edge 56, 58 of which opens into the corresponding groove 82a-c so that each edge 56, 58 can be overmoulded with the corresponding cord 46a-c of the final lining 36.

Then the final lining 36 is molded on the final die 80. The final lining 36 is molded in a metal which, in this particular instance, contains aluminium. Note that the final die 36 has been manufactured by overmoulding the edge 56, 58 of the blades 52a-b with a cord 46a-c used for molding the grooves 32a-c.

The final die 80 is then broken up to release the final lining 36.

The tire 10 can be manufactured by implementing a method according to the invention the main steps of which will be described hereinbelow.

A raw green tire preform 10 is positioned in a mould comprising several final linings 36 of the type of those described hereinabove, distributed circumferentially about the axis Y of the mould.

Once the mould has been closed, the raw preform is vulcanized in the mould by heating the mould.

The mould is then opened and the vulcanized tire 10 removed.

The cords 46a-c placed on the blades 52a-b are extracted by shifting the mould radially across the cuts 26a-b formed by the blades 52a-b in the tread 12.

From studying the foregoing and without departing from the spirit of the invention, it is entirely possible to alter the shape of the network of grooves and the distribution of the cuts in the tread of the tire to suit the constraints dictated by desired tire performance.

This advantage makes is possible to broaden the tire design options by reducing the limits imposed by the methods of the prior art. It will be noted that, without departing from the scope of the invention, it is possible to manufacture the network 44, 45 of the final lining 36 directly from the mould counterpart 66 without going through the stages of molding the intermediate lining 75 and the final die 80.

The invention claimed is:

1. A lining for a mold for vulcanizing a tire, comprising:
    at least one network of cords for molding a corresponding network of grooves in the tread of the tire, comprising at least one circumferential cord, at least one transverse cord, and at least one radial cord, for molding a circumferential groove, a transverse groove, and a radial groove, respectively, in the tread;
    at least one network of sipe blades for molding a corresponding network of cuts in the tread;
wherein the at least one network of cords and the at least one network of sipe blades intersect at at least one node between at least one circumferential cord and at least one transverse cord, and
wherein each cord of the network overmolds at least the edge of a sipe blade in the at least one network of sipe blades.

2. The lining according to claim 1, wherein the at least one radial cord for molding a radial groove in the tread forms the at least one node.

3. A mold for vulcanizing a green tire preform, comprising at least one lining for a mold according to claim 1.

4. A method of manufacturing a lining for molding part of a tread of a tire, the lining comprising:
    at least one network of cords for molding a corresponding network of grooves in the tread of the tire, comprising at least one circumferential cord, at least one transverse cord, and at least one radial cord, for molding a circumferential groove, a transverse groove, and a radial groove, respectively, in the tread;
    at least one network of sipe blades for molding a corresponding network of cuts in the tread;
wherein the at least one network of cords and the at least one network of sipe blades intersect at at least one node between at least one circumferential cord and at least one transverse cord, and
wherein each cord of the network overmolds at least the edge of a sipe blade in the at least one network of sipe blades;
wherein the method comprises overmolding edges of a network of blades for molding a corresponding network of cuts in the tread with a network of cords for molding a corresponding network of grooves in the tread.

5. The method according to claim 4, wherein each blade is made of steel and each cord is made of aluminium.

6. The method according to claim 4, wherein the lining is molded on a die known as the final die, the final die comprising: a network of grooves for molding the network of cords of the lining, and a network of blades, the edges of which open into the network of grooves for molding the network of cords of the lining so that the edges of the network of blades can be overmolded with the network of cords of the final lining.

7. The method according to claim 6, wherein the final die is made of a material which is inert towards the material in which the network of cords of the lining is molded.

8. The method according to claim 7, wherein, prior to molding the lining on the final die, the final die is manufactured by: manufacturing an intermediate lining, and molding the final die on the intermediate lining.

9. The method according to claim 8, wherein the intermediate lining comprises: at least one removable intermediate network molded in a mold counterpart, the network comprising a network of intermediate cords for molding the network of grooves of the final die overmolded over the edges of the network of blades, and a base comprising at least one housing for positioning the intermediate removable network.

10. The method according to claim 9, wherein the network of intermediate cords of the intermediate removable network is mounted in a material that can be melted.

11. The method according to claim 10, wherein the mold counterpart comprises: a network of intermediate grooves for molding the network of intermediate cords of the intermediate removable network, and housings for positioning of the network of blades of the final lining, each housing opening into an intermediate groove.

12. The method according to claim 11, wherein: after the final die has been molded on the intermediate lining, and before the final lining is molded on the final die, each intermediate cord is melted.

13. A mold counterpart for molding a network of cords and of blades of a mold lining for molding part of a tread of a tire, the lining comprising:
    at least one network of cords for molding a corresponding network of grooves in the tread of the tire, comprising at least one circumferential cord, at least one transverse cord, and at least one radial cord, for molding a circumferential groove, a transverse groove, and a radial groove, respectively, in the tread;
    at least one network of sipe blades for molding a corresponding network of cuts in the tread;
wherein the at least one network of cords and the at least one network of sipe blades intersect at at least one node between at least one circumferential cord and at least one transverse cord, and
wherein each cord of the network overmolds at least the edge of a sipe blade in the at least one network of sipe blades;
wherein the mold counterpart comprises: a network of grooves for molding a network of cords, and housings for positioning the network of blades with respect to the network of grooves and opening into at least one of the grooves.

14. A method of vulcanizing a green tire preform, comprising vulcanizing a green preform in a mold according to claim 3.

15. The lining according to claim 1, further comprising at least two radially spaced circular cords for molding a corresponding channel in the tread of the tire.

16. The lining according to claim 15, wherein the radially spaced circular cords are substantially parallel to the at least one circumferential cord and intersect at least one transverse cord, and are thereby connected to the at least one circumferential cord.

17. The lining according to claim 1, wherein the at least one radial cord forms a lug connecting the at least one circumferential cord to a molding surface of a mold.

18. The lining according to claim 1, wherein the at least one network of sipe blades comprises at least one circumferential blade and at least one transverse blade.

* * * * *